United States Patent
Wellhoefer et al.

(10) Patent No.: US 11,136,850 B2
(45) Date of Patent: Oct. 5, 2021

(54) ELASTOMER WITH AN EXPANDABLE METAL

(71) Applicant: Halliburton Energy Services, Inc., Houston, TX (US)

(72) Inventors: Benjamin Jon Wellhoefer, Montgomery, TX (US); Geir Gjelstad, Dallas, TX (US); Michael Linley Fripp, Carrollton, TX (US); Zachary William Walton, Carrollton, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 128 days.

(21) Appl. No.: 16/485,382

(22) PCT Filed: Jun. 28, 2018

(86) PCT No.: PCT/US2018/040005
§ 371 (c)(1),
(2) Date: Aug. 12, 2019

(87) PCT Pub. No.: WO2020/005252
PCT Pub. Date: Jan. 2, 2020

(65) Prior Publication Data
US 2020/0362224 A1    Nov. 19, 2020

(51) Int. Cl.
*E21B 33/12* (2006.01)
*C09K 8/508* (2006.01)
*E21B 33/127* (2006.01)

(52) U.S. Cl.
CPC ........ *E21B 33/1208* (2013.01); *C09K 8/5083* (2013.01); *C09K 8/5086* (2013.01); *E21B 33/1277* (2013.01); *E21B 33/1212* (2013.01)

(58) Field of Classification Search
CPC .................................................. E21B 33/1208
See application file for complete search history.

(56) References Cited

U.S. PATENT DOCUMENTS

| | | |
|---|---|---|
| 2008/0149351 A1 | 6/2008 | Marya et al. |
| 2012/0175134 A1 | 7/2012 | Robisson et al. |
| 2013/0056207 A1 | 3/2013 | Wood et al. |
| 2013/0096038 A1 | 4/2013 | Kim et al. |
| 2014/0051612 A1 | 2/2014 | Mazyar et al. |
| 2020/0325749 A1* | 10/2020 | Fripp ...................... E21B 33/10 |

OTHER PUBLICATIONS

ISRWO International Search Report and Written Opinion for PCT/US2018/040005 dated Mar. 19, 2019.
Hallburton, Swell Technology, https://www.halliburton.com/en-US/ps/completions/well-completions/swell-technology/default.html.
Hallburton, Illusion Spire Frac Plug, https://www.halliburton.com/en-US/ps/service-tools/drillable-tools/dissolvable-tools/Illusion-Frac-Plug.html.
Hallburton, RapidBall, https://www.halliburton.com/en-US/ps/service-tools/well-completions/horizontal-completions/RapidBall.html.

* cited by examiner

*Primary Examiner* — Kristyn A Hall
(74) *Attorney, Agent, or Firm* — Scott Richardson; C. Tumey Law Group PLLC

(57) ABSTRACT

A method may comprise: inserting an apparatus into a wellbore, wherein the apparatus comprises: a seal element comprising: an elastomer; and a swellable metal embedded in the elastomer; exposing the seal element to a fluid; transitioning the seal element from an initial state with an initial volume to an expanded state with an expanded volume to form a seal in the wellbore.

20 Claims, 3 Drawing Sheets

ELASTOMER WITH AN EXPANDABLE METAL

BACKGROUND

During various stages of performing wellbore operations, fluid isolation and flow direction may be required. After drilling a wellbore, production tubing may be placed in the wellbore and hydrocarbons drawn from surrounding hydrocarbon-bearing formations. A packer may be placed on the production tubing to seal against a casing thereby isolating and protecting the casing and up-string equipment. By use of packers, zonal isolation in the well may be achieved.

A packer may comprise a swellable material that provides sealing pressure by expanding in volume and pushing against a sealing surface. The swellable material may be an elastomer blended with a superabsorbent polymer or salt, for example. Osmosis may drive water into the elastomer causing the superabsorbent polymer or salt to hydrate and increase in volume, which in turn may cause the elastomer to expand in volume. Elastomers may be manufactured with different species and concentration of salts or super absorbent polymers embedded in the elastomer matrix to control the amount of water permeating into the elastomer matrix, thereby controlling the swell volume and final sealing pressure achieved. Since osmosis is dependent on the molar concentration of dissolved chemical species such as salt in the elastomer and the surrounding fluids, changes in the downhole conditions can reverse the swelling process. In applications such as dry gas wells, an elastomer may lose sealing pressure as water may leave the elastomer matrix causing a decrease in volume and a reduction in sealing pressure.

BRIEF DESCRIPTION OF THE DRAWINGS

These drawings illustrate certain aspects of the present disclosure, and should not be used to limit or define the disclosure.

DETAILED DESCRIPTION

Figure 1:
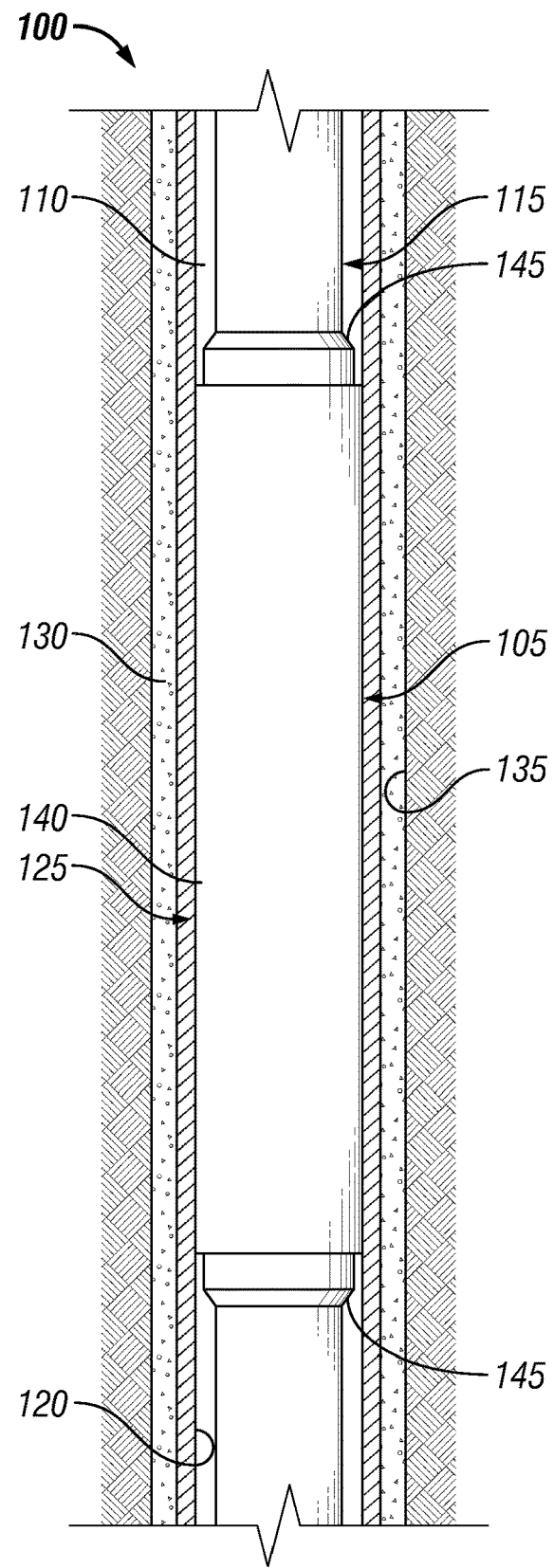
FIG. 1 is a cross-sectional view of a wellbore with a sealing apparatus disposed therein.

The systems, methods, and/or compositions disclosed herein may relate to subterranean operations and, in some apparatus, methods, and compositions, to a sealing apparatus comprising an elastomer and a swellable metal embedded in the elastomer. The swellable metal, when exposed to a downhole fluid such as an aqueous fluid, may expand in size by transitioning from a first configuration having a first volume to an expanded configuration having a second volume. During this expansion, water may react with the swellable metal to cause the volume of the swellable metal to increase, thereby increasing the total volume of the elastomer with the embedded swellable metal. Generally, an elastomer may not swell appreciably in water without a superabsorbent polymer or salt present. Osmosis of water through the elastomer may be driven by a chemical potential of hydrogen bonding between water molecules and the superabsorbent polymer, ionic dissociation salt in the water, or hydration of the salt by the water.

As previously mentioned, a swellable packer may comprise an elastomer with a water swellable material, such as a salt or superabsorbent polymer, which may provide for the elastomer to transition from a relatively smaller initial volume to a relatively larger final volume. Elastomer compounds used may not swell in water by themselves. In some examples a particular elastomer may be regarded as inert to swelling from contact with water. Some elastomer compounds may swell, or transition from a relatively smaller initial volume to a relatively larger final volume on contact with liquid hydrocarbons or oil-based liquids. In some examples described herein, an elastomer comprising a swellable metal may be considered hybrid swellable as swelling may be driven by two different mechanisms. A swellable packer comprising an elastomer and swellable metal may swell in both aqueous-based liquids as well as oil-based liquids.

The expanded configuration may have a larger volume than the first configuration which may cause the elastomer to contact an adjacent surface, such as an inner diameter of a tubular, rock face, or open hole. As the elastomer transitions from the first configuration to the second configuration, the contact pressure between the elastomer and adjacent surface may increase, thereby forming a seal between the elastomer and adjacent surface. The seal may act to inhibit fluid flow across the elastomer, thereby providing zonal isolation or flow restriction across the elastomer. For instance, the elastomer, upon transitioning to the expanded configuration in an annulus of a fluidic channel, may form a seal against a surface of the fluidic channel such that fluidic flow across the elastomer in the annulus is prevented or restricted.

The sealing apparatus may be any apparatus that comprises an elastomer such as for example, without limitation, packers, swellable components in liner hangers, liner tiebacks, scab liners, shoe joints, wellhead isolation sleeves, frac isolation sleeves, slip-on isolation sleeves, cementing isolation sleeves, production zone isolation sleeves, bridge plug, and oilfield tubulars and comprising an elastomer and a swellable metal embedded in the elastomer. In some examples, the sealing apparatus may be disposed on a tubular. The sealing apparatus may be used in any wellbore application such as open hole or cased hole.

The elastomer may be any elastomeric material that is capable of expanding in volume. Some examples of suitable elastomers may include, without limitation, natural polyisoprene such as cis-1,4-polyisoprene and trans-1,4-polyisoprene, 1,2-polyisoprene, 3,4-polyisoprene, synthetic polyisoprene, polybutadiene, polychloroprene, polyisobutylene, chloro butyl rubber, bromo butyl rubber, styrene-butadiene rubber, nitrile rubber, hydrogenated nitrile rubber, ethylene propylene rubber, ethylene propylene diene rubber, epichlorohydrin rubber, polyacrylic rubber, silicone rubber, fluorosilicone rubber, fluoroelastomers (also known as FKM's which may be defined by ASTM D1418) such as copolymers of hexafluoropropylene and vinylidene fluoride, terpolymers of tetrafluoroethylene, vinylidene fluoride, and hexafluoropropylene, and copolymers of tetrafluoroethylene, propylene, ethylene, tetrafluoroethylene, and perfluoromethylvinylether, perfluoroelastomers such as copolymers of vinylidene fluoride and hexafluoropropylene, terpolymers of vinylidene fluoride, hexafluoropropylene, and tetrafluoroethylene, terpolymers of vinylidene fluoride, tetrafluoroethylene, and perfluoromethylvinylether, terpolymers of propylene, tetrafluoroethylene, and vinylidene fluoride, and polymers of vinylidene fluoride, hexafluoropropylene, tetrafluoroethylene, perfluoromethylvinylether, and ethylene, polyether block amide, chlorosulfonated polyethylene, ethylene-vinyl acetate, thermoplastic elastomers, polysulfide rubber, and combinations thereof.

As used herein, the term swellable metal is any hydrolysable metal material that expands in volume upon hydrolyzing. The swellable metal may react with water in a downhole fluid through the hydrolysis reaction to form a metal hydroxide product and/or a metal oxide product. Hydrolysis of a metal may also be referred to as a metal hydration reaction. The volume of the swellable metal may increase during the reaction, as the products of the metal hydration reaction may have a greater volume than the original metal. As a result, the metal hydroxide product of the hydrolysis reaction may occupy more volume as compared to the non-reacted swellable metal. Upon transitioning to the expanded configuration through the metal hydration reaction, the volume of the swellable metal may increase, for example, by approximately about 10% or more when allowed to react and increase in volume in an unconfined manner.

A swellable metal may comprise an alkaline earth metal, a transition metal, a lanthanide, a post-transition metal, and combinations thereof. For example, some suitable alkaline earth metals may include, without limitation, beryllium, magnesium, calcium, strontium, and combinations thereof. Some suitable transition metals may include, without limitation, vanadium, chromium, manganese, iron, nickel, zinc, yttrium, zirconium, silver, rhenium, and combinations thereof. Some suitable lanthanides may include, without limitation, neodymium, and galodiunium. Some suitable post-transition metals may include, without limitation, aluminum, and tin. A swellable metal may comprise any combination of post-transition metals, transition metals, lanthanides, or alkaline earth metals. An exemplary swellable metal may comprise magnesium, calcium, aluminum, or combinations thereof. A swellable metal may comprise an oxide of post-transition metals, an oxide of transition metals, an oxide of lanthanides, an oxide of alkaline earth metals, or combinations thereof. A swellable metal may comprise an alloy of any of the previously mentioned elements. An exemplary alloy may comprise an alloy of magnesium and aluminum. A swellable metal alloy may be designed more reactive than the base metals that make the alloy. An alloy may be tuned to control the formation of hydroxides and oxides, for example by heat treatment to adjust grain sizes or sizes of crystal structure inclusions. An alloy may, for example, provide different swell times for a particular sealing apparatus. An alloy may decrease a time required for a sealing apparatus to reach the second configuration. An alloy may be tuned to provide a particular swell time for a particular application.

Any of the previously mentioned swellable metals or alloys thereof may be further doped with a corrosion promoter, for example by alloying with a material with a higher galvanic potential in order to create micro galvanic corrosion sites. A corrosion promoter may include, without limitation, nickel, iron, copper, cobalt, iridium, gold, titanium, carbon, palladium, or any other suitable dopant that promotes corrosion. Additional ions can also be added to the swellable metal, for example, silicate, sulfate, aluminate, phosphate, or any other suitable ions. A corrosion promoter may, without limitation, provide different swell times for a particular sealing apparatus. A corrosion promoter may decrease a time required for a sealing apparatus to reach the second configuration. An alloy comprising a corrosion promoter may be tuned to provide a particular swell time for a particular application.

The swellable metal can be produced by any means, including, but not limited to, a solid solution process where the elements are combined with molten metal, power metallurgy, or any other suitable process to produce an alloy. One of ordinary skill in the art with the benefit of this disclosure should be able to select an appropriate swellable metal for a particular application.

There may be three principle steps through which the swellable metal swells to provide sealing pressure. First, the swellable metal may react with an aqueous-based fluid in the wellbore to create particles of metal hydroxide. Second, the metal hydroxide particles may be confined in a small space, such as between tubing and the casing or within an elastomeric matrix. Third, the confined metal hydroxide particles may be pressed together to form a solid sealing structure. The metal hydroxide particles may be pressed together by the continued reaction of the metal with the aqueous-based fluid.

A swellable metal may be any shape such as, without limitation, a powder, shavings, metal turnings, toroids, spheres, flakes, needles, strings, sheets, mesh, rings, or any other suitable shape. Furthermore, the swellable metal may have any particle size or particle size distribution appropriate for a particular application. The swellable metal may have a Dv50 particle size at a point in a range of from about 10 nanometers (nm) to about 1000 micron. Alternatively, the swellable metal may have a $D_v50$ particle size at a point in a range of from about 10 nm to about 500 nm, at a point in a range of from about 500 nm to about 1 micron, at a point in a range of from about 1 micron to about 100 micron, at a point in a range of from about 100 micron to about 300 micron, at a point in a range of from about 300 micron to about 500 micron, at a point in a range of from about 500 micron to about 800 micron, or at a point in a range of from about 800 micron to about 1000 micron. The $D_v50$ particle size may also be referred to as the median particle size by volume of a particulate material. The $D_v50$ particle size is defined as the maximum particle diameter below which 50% of the material volume exists. The $D_v50$ particle size values for a particular sample may be measured by commercially available particle size analyzers such as those manufactured by Malvern Instruments, Worcestershire. United Kingdom. Different swell times, or time for a particular sealing apparatus to reach the second configuration, may be achieved by adjusting the particle size or particle size distributions of swellable metal present in the elastomer in the sealing apparatus. For example, relatively smaller particle sizes of a swellable metal may degrade quicker than a relatively larger particle size of the same swellable metal. One of ordinary skill in the art with the benefit of this disclosure should be able to select an appropriate shape and particulate size range for the swellable metal for a particular application.

Additionally, the volume of a second configuration of a particular sealing apparatus may be controlled by adjusting a concentration of a swellable metal in the elastomer. The swellable metal may be present in the elastomer at a point in range of about 0.1 wt. % of the elastomer to about 500 wt. % of the elastomer. Alternatively, at a point in range of about 0.1 wt. % to about 5 wt. %, at a point in range of about 5 wt. % to about 10 wt. % at a point in range of about 10 wt. % to about 50 wt. %, at a point in range of about 50 wt. % to about 100 wt. %, at a point in range of about 100 wt. % to about 150 wt. %, at a point in range of about 150 wt. % to about 200 wt. %, at a point in range of about 200 wt. % to about 250 wt. %, at a point in range of about 250 wt. % to about 350 wt. %, at a point in range of about 350 wt. % to about 450 wt. %, or at a point in range of about 450 wt. % to about 500 wt. %.

A general hydrolysis reaction of a metal is illustrated below in Equation 1. In this example, M is a metal, O is oxygen, H is hydrogen, and a, b and c are stoichiometric coefficients.

$$M + aH_2O \rightarrow M(OH)_b + cH_2 \quad [1]$$

A specific hydrolysis reaction for magnesium metal is illustrated below in Equation 2.

$$Mg + 2H_2O \rightarrow Mg(OH)_2 + H_2 \quad [2]$$

Magnesium metal has a molar mass of 24 grams/mole and a density of 1.74 g/cm$^3$ which gives a molar volume of 13.8 cm$^3$/mole. Magnesium hydroxide (Mg(OH)$_2$) has a molar mass of 60 grams/mole and a density of 2.34 g/cm$^3$ which gives a molar volume of 25.6 cm$^3$/mole. Therefore, one mole of fully hydrolyzed magnesium hydroxide may have 85% more volume than one mole of non-hydrolyzed magnesium metal.

A hydrolysis reaction of aluminum metal is illustrated below in Equation 3.

$$Al + 3H_2O \rightarrow Al(OH)_3 + 3/2H_2 \quad [3]$$

Aluminum metal has a molar mass of 27 grams/mole and a density of 2.7 g/cm$^3$ which gives a molar volume of 10 cm$^3$/mole. Aluminum hydroxide (Al(OH)$_3$) has a molar mass of 63 grams/mole and a density of 2.24 g/cm$^3$ which gives a molar volume of 26 cm$^3$/mole. Therefore, one mole of fully hydrolyzed aluminum hydroxide may have 160% more volume than one mole of non-hydrolyzed aluminum metal.

A hydrolysis reaction of calcium metal is illustrated below in Equation 4.

$$Ca + 2H_2O \rightarrow Ca(OH)_2 + H_2 \quad [4]$$

Calcium metal has a molar mass of 40 grams/mole and a density of 1.54 g/cm$^3$ which gives a molar volume of 26 cm$^3$/mole. Calcium hydroxide (Ca(OH)$_2$) has a molar mass of 74 grams/mole and a density of 2.21 g/cm$^3$ which gives a molar volume of 33.5 cm$^3$/mole. Therefore, one mole of fully hydrolyzed calcium hydroxide may have 28% more volume than one mole of non-hydrolyzed calcium metal.

Under certain conditions, some hydrolyzed metals can react further to provide secondary products. For example, under elevated temperature, a dehydration reaction may occur that forms secondary products. Magnesium hydroxide may dehydrate to form magnesium oxide (MgO), calcium hydroxide may dehydrate to calcium oxide (CaO), and similarly aluminum hydroxide may dehydrate to aluminum oxide hydroxide (AlO(OH)) or aluminum oxide Al$_2$O$_3$. In another example, a metal may be oxidized. In another example, the swellable metal may be provided in oxide form such as calcium oxide. Calcium oxide may react with water to form calcium hydroxide as illustrated in Equation 5.

$$CaO + H_2O \rightarrow Ca(OH)_2 \quad [5]$$

Calcium oxide has a molar mass of 56 grams/mole and a density of 2.21 g/cm$^3$ which gives a molar volume of 33.52 cm$^3$/mole. Calcium hydroxide (Ca(OH)$_2$) has a molar mass of 74 grams/mole and a density of 2.21 g/cm$^3$ which gives a molar volume of 33.52 cm$^3$/mole. Therefore, one mole of fully hydrolyzed calcium hydroxide may have 200% more volume than one mole of calcium oxide.

As previously discussed, water may cause the expandable metal and elastomer to increase in volume. Water that may be used to cause volume increase may be from any source, for example, freshwater, saltwater (e.g., water containing one or more salts dissolved therein), brine (e.g., saturated saltwater containing monovalent or divalent group 1 and group 2 ions or formate based salts), produced water from subterranean formations, seawater, or combinations thereof. Generally, the water may be from any source, provided that the water does not contain an excess of compounds that may undesirably affect components of the sealing apparatus. A source of water may be selected based on the identity of the elastomer and the swellable metal, for example. In an example, the water may be a brine comprising saturated monovalent chloride species. A certain water source may be selected based on the ionic concentration of one or more dissolved species, such as a salt. Additionally, the ionic concentration of one or more dissolved chemical species may be selected to control the final volume of the expanded configuration. For example, selecting a water source with a relatively higher concentration of a dissolved salt may cause the final volume of the expanded configuration to be larger than selecting a water source with a relatively lower concentration of a dissolved salt. One of ordinary skill in the art, with the benefit of this disclosure, will recognize the appropriate source of water and dissolved chemical species to include for a chosen application.

In addition to water swelling a swellable metal, an oil-based fluid may be provided that may swell the elastomer. Various oil-based fluids may comprise, for example, crude oil, diesel oil, kerosene, aliphatics, parrafins, aromatics, alkanes, alkenes, alkynes, light cycle oils, heavy vacuum oils, synthetic ester oils, oil-based fluids and gas or liquid hydrocarbons located in subterranean formations, and combinations thereof. One of ordinary skill in the art, with the benefit of this disclosure, will recognize the appropriate oil-based fluid particular application.

As used herein, the term sealing element may comprise the elastomer and swellable metal embedded in the elastomer. The sealing element may consist substantially of the elastomer and swellable metal embedded in the elastomer, for example 90% or more by weight.

With reference to in FIG. 1, wellbore apparatus 100 is illustrated which embodies principles of the present disclosure. In wellbore apparatus 100, packer assembly 105 may be used to provide a fluid and pressure barrier in annulus 110 formed between tubular string 115 and casing interior surface 120. Casing 125 may be encased in cement 130 which provides structural support to the wellbore and casing. Although casing interior surface 120 of casing 125 is depicted as being the sealing surface, the surface could instead be formed on an interior wall of a formation 135 (for example, in an uncased portion of the well), a liner, a surface casing, a tubular, or could be any other surface in the well. Packer assembly 105 may include a seal element 140 which is outwardly extended in order to sealingly engage casing interior surface 120. Seal element 140 may include an elastomer and a swellable metal embedded in the elastomer which swell in response to contact with a certain fluids in the wellbore as previously described.

When seal element 140 swells on contact with a fluid, end rings 145 may prevent longitudinal expansion of seal element 140 thereby forcing seal element 140 to expand radially outward into contact with the casing interior surface 120 of the casing 125, or in the instance of an uncased borehole, an inner surface of the formation 135.

Figure 2A:
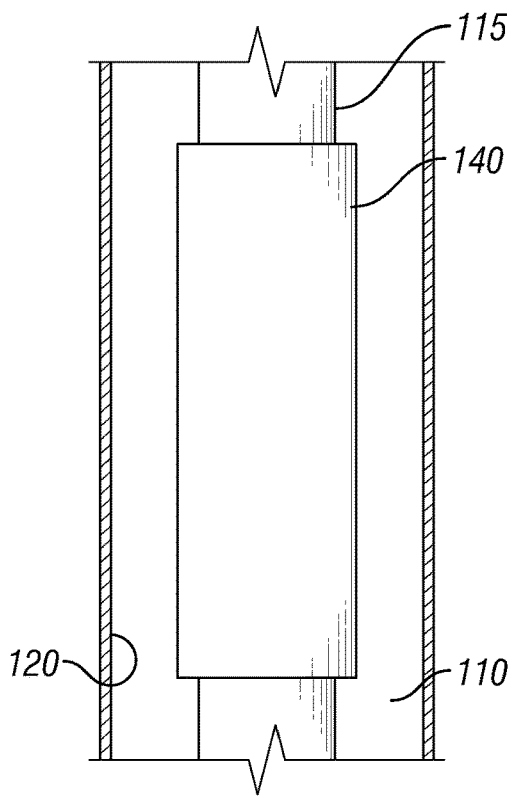
FIG. 2A is schematic illustration of a sealing apparatus undergoing expansion.

With reference to FIG. 2A, seal element 140 is shown in a first unexpanded configuration. Seal element 140 may be disposed on tubular string 115 as in FIG. 1. Annulus 110 may be initially empty of fluids that cause seal element 140 to swell. Alternatively, annulus 110 may contain one or more fluids such as water or oil. Annulus 110 may be formed between an outer tubular such as a surface casing, intermediate casing, production tubing, drill string, pipeline or any other surface as previously described. A cross sectional shape of annulus 110 may be circular, ovoid, rectangular, or any other suitable shape.

Figure 2B:
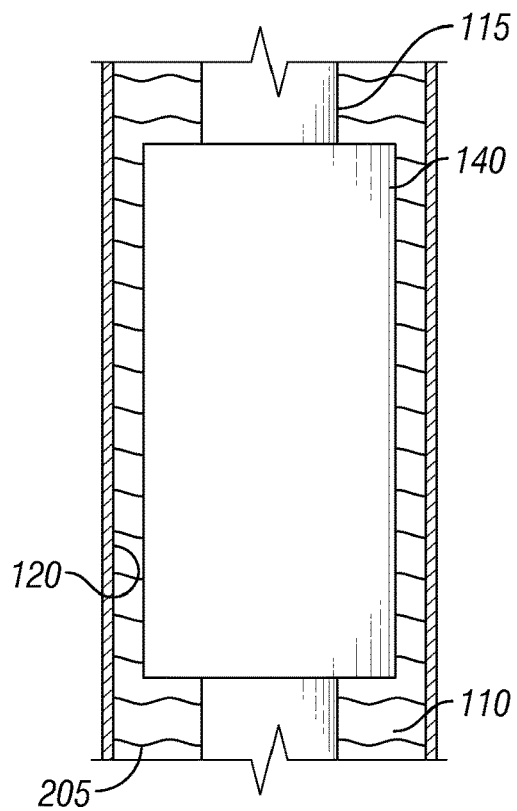
FIG. 2B is schematic illustration of a sealing apparatus undergoing expansion.

With reference to FIG. 2B, annulus 110 is shown filled with fluid 205. Fluid 205 may be any fluid that causes seal element 140 to swell. As previously discussed, some suitable fluids may be aqueous-based fluids. Fluid 205 may permeate into seal element 140 and cause the swellable metal to hydrolyze and increase in volume. Additionally, oil-based fluids may be provided to cause an elastomer in seal element 140 to swell. Fluid 205 may be introduced to annulus 110 by any means. For example, fluid 205 may be introduced into annulus 110 by a surface pump fluidically coupled to tubular string 115. Fluid 205 may flow down through the interior of tubular string 115 and exit an end portion of tubular string 155 to flow up into annulus 110. Alternatively, annulus 110 may be fluidically coupled to a surface pump and fluid 205 may be pumped down through annulus 110 and up into an interior of tubular string 115.

Figure 2C:
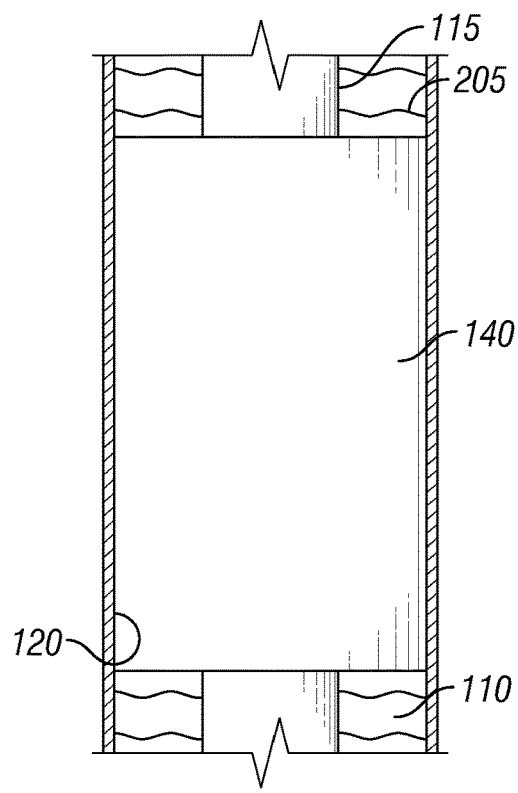
FIG. 2C is schematic illustration of a sealing apparatus undergoing expansion.

With reference to FIG. 2C, seal element 140 is shown in the expanded configuration after fluid 205 permeated into seal element 140 causing the swellable metal to increase in volume. In the expanded configuration, seal element 140 may contact casing interior surface 120, preventing or restricting further fluid and pressure migration across seal element 140.

Figure 3:
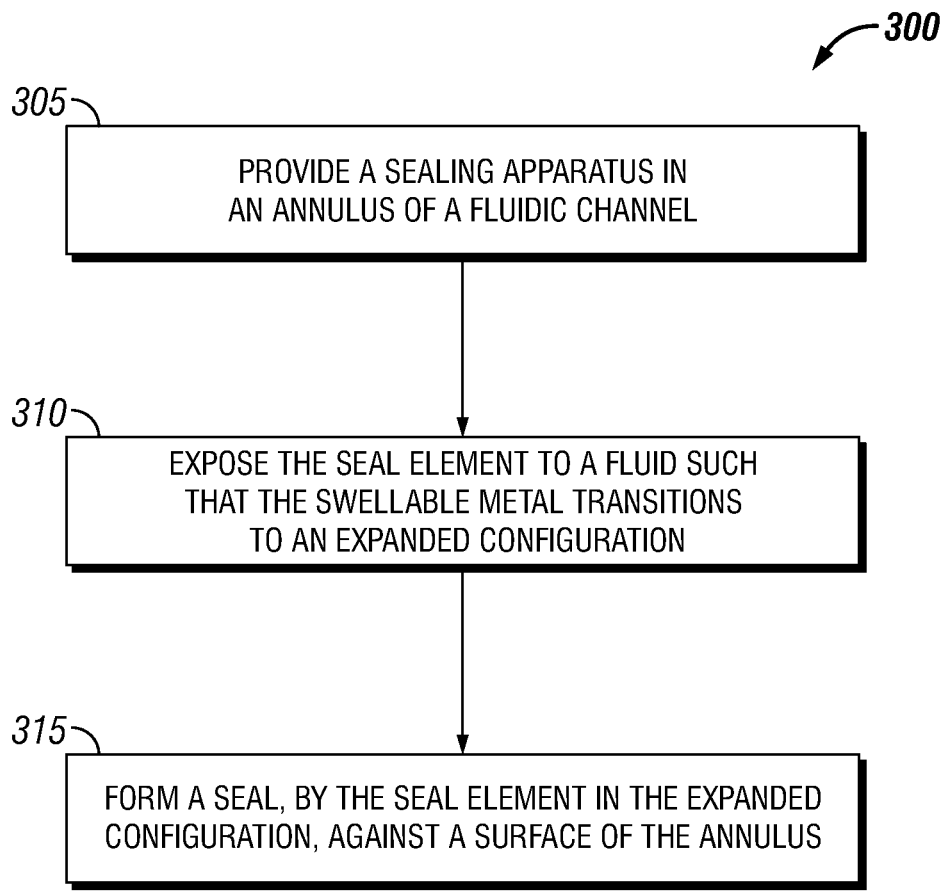
FIG. 3 is a flowchart of a method utilizing a sealing apparatus.

With reference to FIG. 3, a flowchart of a method employing the sealing apparatus of the present disclosure is illustrated. Method 300 is provided by way of example, as there may be a variety of ways to carry out the method. Method 300 described below may be carried out using the configurations illustrated in FIG. 3, for example, or a permutation thereof. Each block shown in FIG. 3 may represent one or more processes, methods or subroutines, carried out in method 300. Furthermore, the order of blocks in FIG. 3 is illustrative only, and a person of ordinary skill in the art, with the benefit of this disclosure, will readily recognize that the order of the blocks can change without departing from the scope of the present disclosure. Additional blocks may be added or fewer blocks may be utilized, without departing from this disclosure. Method 300 may begin at block 305.

At block 305, a sealing apparatus is provided in an annulus of a fluidic channel. The sealing apparatus may include a seal element comprising an elastomer with a swellable metal embedded therein as previously described. The swellable metal may transition to an expanded configuration with an increased volume upon after undergoing hydrolization when exposed to an appropriate fluid. The sealing apparatus may also include an encapsulant disposed on an exterior surface of the seal element that may prevent or slow diffusion of a fluid into the seal element. The encapsulant may comprise a hydrolysable material that may dissolve over time when exposed to a fluid such as an aqueous fluid, brine, acid, or combinations thereof. In examples where the seal element comprises an encapsulant, the time it takes for the swellable metal to transition to the expanded configuration may be increased as compared to an example where the seal element does not comprise an encapsulant.

At block 310, the seal element is exposed to a fluid, and the swellable metal may transition from an initial configuration to an expanded configuration with an increased volume. The fluid may permeate the seal element by osmosis as previously described. The fluid, when reacted with the swellable metal, may hydrolyze the swellable metal. The fluid may be, for example, brine. The water in the brine can react with the swellable metal such that the swellable metal hydrolyzes to a metal hydroxide and/or a metal oxide. When the swellable metal hydrolyzes to a metal hydroxide and/or a metal oxide, the volume of the reactants may be greater than the initial solid material. As such, the volume of the swellable metal may increase when in the expanded configuration. As the swellable metal expands in volume, the swellable metal particles may push against the molecules of elastomer, causing the bulk volume of seal element comprising the elastomer and swellable metal to increase in volume.

At block 310, a seal may be formed by the seal element in the expanded configuration against a surface of the annulus. The seal may be formed by the seal element directly against the surface of the annulus. In other examples, the seal may be formed by the encapsulant, when present, abutting the surface of the annulus. The seal formed by the sealing apparatus may prevent fluid communication across the sealing apparatus within the annulus of the fluidic channel. As such, the sealing apparatus may isolate pressure and fluids from other sections of the fluidic channel. A distribution of the swellable metal may be nonhomogeneous within the elastomer of the seal element. A concentration of the swellable metal may be higher towards the ends of the seal element, for example. Alternatively, a concentration may be higher towards the center of the seal. In one example, the outer surface may comprise a lower concentration of the swellable metal while the inner surface may comprise a higher concentration of the swellable metal.

It is also to be recognized that the disclosed sealing apparatus may also directly or indirectly affect the various downhole equipment and tools that may come into contact with the sealing apparatus during operation. Such equipment and tools may include, but are not limited to, wellbore casing, wellbore liner, completion string, insert strings, drill string, coiled tubing, slickline, wireline, drill pipe, drill collars, mud motors, downhole motors and/or pumps, surface-mounted motors and/or pumps, centralizers, scratchers, floats (e.g., shoes, collars, valves, etc.), logging tools and related telemetry equipment, actuators (e.g., electromechanical devices, hydromechanical devices, etc.), sliding sleeves, production sleeves, plugs, screens, filters, flow control devices (e.g., inflow control devices, autonomous inflow control devices, outflow control devices, etc.), couplings (e.g., electro-hydraulic wet connect, dry connect, inductive coupler, etc.), control lines (e.g., electrical, fiber optic, hydraulic, etc.), surveillance lines, drill bits and reamers, sensors or distributed sensors, downhole heat exchangers, valves and corresponding actuation devices, tool seals, packers, cement plugs, bridge plugs, and other wellbore isolation devices, or components, and the like.

Accordingly, this disclosure describes apparatus, methods, and compositions that may relate to subterranean operations. The apparatus, methods, and compositions may further be characterized by one or more of the following statements:

Statement 1. An apparatus comprising: an elastomer; and a swellable metal embedded in the elastomer.

Statement 2. The apparatus of statement 1 wherein the elastomer comprises an elastomer selected from the group consisting of cis-1,4-polyisoprene, trans-1,4-polyisoprene, 1,2-polyisoprene, 3,4-polyisoprene, synthetic polyisoprene, polybutadiene, polychloroprene, polyisobutylene, chloro butyl rubber, bromo butyl rubber, styrene-butadiene rubber, nitrile rubber, hydrogenated nitrile rubber, ethylene propylene rubber, ethylene propylene diene rubber, epichlorohydrin rubber, polyacrylic rubber, silicone rubber, fluorosilicone rubber, copolymers of hexafluoropropylene and vinylidene fluoride, terpolymers of tetrafluoroethylene, vinylidene fluoride, and hexafluoropropylene, polymers of tetrafluoroethylene, propylene, ethylene, tetrafluoroethylene, and perfluoromethylvinylether, polymers of vinylidene fluoride and hexafluoropropylene, terpolymers of vinylidene fluoride, hexafluoropropylene, and tetrafluoroethylene, terpolymers of vinylidene fluoride, tetrafluoroethylene, and perfluoromethylvinylether, terpolymers of propylene, tetrafluoroethylene, and vinylidene fluoride, and polymers of vinylidene fluoride, hexafluoropropylene, tetrafluoroethylene, perfluoromethylvinylether, and ethylene, polyether block amides, chlorosulfonated polyethylene, ethylene-vinyl acetate, thermoplastic elastomers, polysulfide rubber, and combinations thereof.

Statement 3. The apparatus of statements 1 or 2 wherein the swellable metal comprises a metal selected from the group consisting of an alkaline earth metal, a transition metal, a lanthanide metal, a post-transition metal, and combinations thereof.

Statement 4. The apparatus of any preceding statement wherein the swellable metal comprises an alloy comprising a corrosion promoter.

Statement 5. The apparatus of any preceding statement wherein the swellable metal is present in an amount of about 0.1 wt. % of the elastomer to about 50 wt. % of the elastomer.

Statement 6. The apparatus of any preceding statement further comprising: a tubular, wherein the elastomer is disposed on an outside surface of the tubular.

Statement 7. A method comprising: inserting into an apparatus into a wellbore, wherein the apparatus comprises: a seal element comprising: an elastomer; and a swellable metal embedded in the elastomer; exposing the seal element to a fluid; transitioning the seal element from an initial state with an initial volume to an expanded state with an expanded volume to form a seal in the wellbore.

Statement 8. The method of statement 7 wherein the wellbore comprises a casing, the seal being formed between the seal element and the casing.

Statement 9. The method of statements 7 or 8 wherein the seal element is disposed on an outside surface of a tubular.

Statement 10. The method of any of statements 7-9 wherein the seal element is coated with a hydrolysable material.

Statement 11. The method of any of statements 7-10 wherein the elastomer comprises an elastomer selected from the group consisting of cis-1,4-polyisoprene, trans-1,4-polyisoprene, 1,2-polyisoprene, 3,4-polyisoprene, synthetic polyisoprene, polybutadiene, polychloroprene, polyisobutylene, chloro butyl rubber, bromo butyl rubber, styrene-butadiene rubber, nitrile rubber, hydrogenated nitrile rubber, ethylene propylene rubber, ethylene propylene diene rubber, epichlorohydrin rubber, polyacrylic rubber, silicone rubber, fluorosilicone rubber, copolymers of hexafluoropropylene and vinylidene fluoride, terpolymers of tetrafluoroethylene, vinylidene fluoride, and hexafluoropropylene, polymers of tetrafluoroethylene, propylene, ethylene, tetrafluoroethylene, and perfluoromethylvinylether, polymers of vinylidene fluoride and hexafluoropropylene, terpolymers of vinylidene fluoride, hexafluoropropylene, and tetrafluoroethylene, terpolymers of vinylidene fluoride, tetrafluoroethylene, and perfluoromethylvinylether, terpolymers of propylene, tetrafluoroethylene, and vinylidene fluoride, and polymers of vinylidene fluoride, hexafluoropropylene, tetrafluoroethylene, perfluoromethylvinylether, and ethylene, polyether block amides, chlorosulfonated polyethylene, ethylene-vinyl acetate, thermoplastic elastomers, polysulfide rubber, and combinations thereof.

Statement 12. The method of any of statements 7-11 wherein the swellable metal comprises a metal selected from the group consisting of an alkaline earth metal, a transition metal, a lanthanide metal, a post-transition metal, and combinations thereof Statement 13. The method of any of statements 7-12 wherein the swellable metal comprises an alloy comprising a corrosion promoter.

Statement 14. The method of any of statements 7-13 wherein the swellable metal is present in an amount of about 0.1 wt. % of the elastomer to about 500 wt. % of the elastomer.

Statement 15. The method of any of statements 7-14 wherein the step of exposing comprises: pumping into a wellbore an aqueous fluid such that the aqueous fluid contacts the seal element.

Statement 16. The method of any of statements 7-15 wherein the step of transitioning comprises: drawing the fluid into the seal element; exposing the swellable metal to the fluid; and hydrolyzing the swellable metal with the fluid to produce a hydrolyzed metal, wherein the hydrolyzed metal has a greater volume than the swellable metal.

Statement 17. A method comprising: inserting into a wellbore a packer disposed on a tubular, wherein the packer comprises a seal element comprising: an elastomer; and a swellable metal embedded in the elastomer; pumping an aqueous fluid into the wellbore; exposing the seal element to the aqueous fluid; hydrolyzing the swellable metal; forming a seal between an outer surface of the seal element and an inner surface of the wellbore.

Statement 18. The method of statement 17 wherein the elastomer comprises an elastomer selected from the group consisting of nitrile rubber, hydrogenated nitrile rubber, FKM, and combinations thereof.

Statement 19. The method of statement 18 wherein the swellable metal comprises a metal selected from the group consisting of magnesium, aluminum, calcium, and combinations thereof.

Statement 20. The method any of statement 17-19 wherein the swellable metal comprises an alloy of a metal and a corrosion promoter.

For the sake of brevity, only certain ranges are explicitly disclosed herein. However, ranges from any lower limit may be combined with any upper limit to recite a range not explicitly recited, as well as, ranges from any lower limit may be combined with any other lower limit to recite a range not explicitly recited, in the same way, ranges from any upper limit may be combined with any other upper limit to recite a range not explicitly recited. Additionally, whenever a numerical range with a lower limit and an upper limit is disclosed, any number and any included range falling within the range are specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values even if not explicitly recited. Thus, every point or individual value may serve as its own lower or upper limit combined with any other point or individual value or any other lower or upper limit, to recite a range not explicitly recited.

What is claimed is:

1. An apparatus comprising:
an elastomer; and
a swellable metal embedded in the elastomer, wherein a distribution of the swellable metal within the elastomer is nonhomogeneous.

2. The apparatus of claim 1 wherein the elastomer comprises an elastomer selected from the group consisting of cis-1,4-polyisoprene, trans-1,4-polyisoprene, 1,2-polyisoprene, 3,4-polyisoprene, synthetic polyisoprene, polybutadiene, polychloroprene, polyisobutylene, chloro butyl rubber, bromo butyl rubber, styrene-butadiene rubber, nitrile rubber, hydrogenated nitrile rubber, ethylene propylene rubber, ethylene propylene diene rubber, epichlorohydrin rubber, polyacrylic rubber, silicone rubber, fluorosilicone rubber, copolymers of hexafluoropropylene and vinylidene fluoride, terpolymers of tetrafluoroethylene, vinylidene fluoride, and hexafluoropropylene, polymers of tetrafluoroethylene, propylene, ethylene, tetrafluoroethylene, and perfluoromethylvinylether, polymers of vinylidene fluoride and hexafluoropropylene, terpolymers of vinylidene fluoride, hexafluoropropylene, and tetrafluoroethylene, terpolymers of vinylidene fluoride, tetrafluoroethylene, and perfluoromethylvinylether, terpolymers of propylene, tetrafluoroethylene, and vinylidene fluoride, and polymers of vinylidene fluoride, hexafluoropropylene, tetrafluoroethylene, perfluoromethylvinylether, and ethylene, polyether block amides, chlorosulfonated polyethylene, ethylene-vinyl acetate, thermoplastic elastomers, polysulfide rubber, and combinations thereof.

3. The apparatus of claim 1 wherein the swellable metal comprises a metal selected from the group consisting of an alkaline earth metal, a transition metal, a lanthanide metal, a post-transition metal, and combinations thereof.

4. The apparatus of claim 1 wherein the swellable metal comprises an alloy comprising a corrosion promoter.

5. The apparatus of claim 1 wherein the swellable metal is present in an amount of about 0.1 wt. % of the elastomer to about 50 wt. % of the elastomer.

6. The apparatus of claim 1 further comprising:
a tubular, wherein the elastomer is disposed on an outside surface of the tubular.

7. A method comprising:
inserting an apparatus into a wellbore, wherein the apparatus comprises:
a seal element comprising:
an elastomer; and
a swellable metal embedded in the elastomer, wherein a distribution of the swellable metal within the elastomer is nonhomogeneous;
exposing the seal element to a fluid; and
transitioning the seal element from an initial state with an initial volume to an expanded state with an expanded volume to form a seal in the wellbore.

8. The method of claim 7 wherein the wellbore comprises a casing, the seal being formed between the seal element and the casing.

9. The method of claim 7 wherein the seal element is disposed on an outside surface of a tubular.

10. The method of claim 7 wherein the seal element is coated with a hydrolysable material.

11. The method claim 7 wherein the elastomer comprises an elastomer selected from the group consisting of cis-1,4-polyisoprene, trans-1,4-polyisoprene, 1,2-polyisoprene, 3,4-polyisoprene, synthetic polyisoprene, polybutadiene, polychloroprene, polyisobutylene, chloro butyl rubber, bromo butyl rubber, styrene-butadiene rubber, nitrile rubber, hydrogenated nitrile rubber, ethylene propylene rubber, ethylene propylene diene rubber, epichlorohydrin rubber, polyacrylic rubber, silicone rubber, fluorosilicone rubber, copolymers of hexafluoropropylene and vinylidene fluoride, terpolymers of tetrafluoroethylene, vinylidene fluoride, and hexafluoropropylene, polymers of tetrafluoroethylene, propylene, ethylene, tetrafluoroethylene, and perfluoromethylvinylether, polymers of vinylidene fluoride and hexafluoropropylene, terpolymers of vinylidene fluoride, hexafluoropropylene, and tetrafluoroethylene, terpolymers of vinylidene fluoride, tetrafluoroethylene, and perfluoromethylvinylether, terpolymers of propylene, tetrafluoroethylene, and vinylidene fluoride, and polymers of vinylidene fluoride, hexafluoropropylene, tetrafluoroethylene, perfluoromethylvinylether, and ethylene, polyether block amides, chlorosulfonated polyethylene, ethylene-vinyl acetate, thermoplastic elastomers, polysulfide rubber, and combinations thereof.

12. The method of claim 7 wherein the swellable metal comprises a metal selected from the group consisting of an alkaline earth metal, a transition metal, a lanthanide metal, a post-transition metal, and combinations thereof.

13. The method of claim 7 wherein the swellable metal comprises an alloy comprising a corrosion promoter.

14. The method of claim 7 wherein the swellable metal is present in an amount of about 0.1 wt. % of the elastomer to about 500 wt. % of the elastomer.

15. The method of claim 7 wherein the step of exposing comprises:
pumping into a wellbore the fluid such that the fluid contacts the seal element, the fluid comprising an aqueous fluid.

16. The method of claim 7 wherein the step of transitioning comprises:
drawing the fluid into the seal element;
exposing the swellable metal to the fluid; and
hydrolyzing the swellable metal with the fluid to produce a hydrolyzed metal, wherein the hydrolyzed metal has a greater volume than the swellable metal.

17. A method comprising:
inserting into a wellbore a packer disposed on a tubular, wherein the packer comprises a seal element comprising:
an elastomer; and
a swellable metal embedded in the elastomer, wherein a distribution of the swellable metal within the elastomer is nonhomogeneous;
pumping an aqueous fluid into the wellbore;
exposing the seal element to the aqueous fluid;
hydrolyzing the swellable metal; and
forming a seal between an outer surface of the seal element and an inner surface of the wellbore.

18. The method of claim 17 wherein the elastomer comprises an elastomer selected from the group consisting of nitrile rubber, hydrogenated nitrile rubber, FKM, and combinations thereof.

19. The method of claim 17 wherein the swellable metal comprises a metal selected from the group consisting of magnesium, aluminum, calcium, and combinations thereof.

20. The method of claim 17 wherein the swellable metal comprises an alloy of a metal and a corrosion promoter.

* * * * *